(12) United States Patent
Westner (10) Patent No.: US 12,475,893 B2
(45) Date of Patent: Nov. 18, 2025

(54) EYEGLASS AUGMENTED REALITY SPEECH TO TEXT DEVICE AND METHOD

(71) Applicant: XanderGlasses, Inc., Somerville, MA (US)

(72) Inventor: Alexander G. Westner, Somerville, MA (US)

(73) Assignee: XanderGlasses, Inc., Somerville, MA (US)

( * ) Notice: Subject to any disclaimer, the term of this patent is extended or adjusted under 35 U.S.C. 154(b) by 265 days.

(21) Appl. No.: 18/010,541

(22) PCT Filed: Aug. 19, 2021

(86) PCT No.: PCT/US2021/046669
§ 371 (c)(1),
(2) Date: Dec. 15, 2022

(87) PCT Pub. No.: WO2022/051097
PCT Pub. Date: Mar. 10, 2022

(65) Prior Publication Data
US 2023/0238001 A1    Jul. 27, 2023

Related U.S. Application Data

(60) Provisional application No. 63/074,210, filed on Sep. 3, 2020.

(51) Int. Cl.
*G10L 15/26* (2006.01)
*G02B 27/01* (2006.01)
(Continued)

(52) U.S. Cl.
CPC .......... *G10L 15/26* (2013.01); *G02B 27/0101* (2013.01); *G02B 27/017* (2013.01);
(Continued)

(58) Field of Classification Search
CPC .... G01H 3/12; G02B 6/0018; G02B 27/0101; G02B 27/017; G02B 2027/0138;
(Continued)

(56) References Cited

U.S. PATENT DOCUMENTS

| 6,629,076 B1 * | 9/2003 | Haken ...................... G01H 3/12 |
| | | 704/271 |
| 7,775,675 B2 | 8/2010 | Hamm |

(Continued)

FOREIGN PATENT DOCUMENTS

| WO | WO-2009/017797 A2 | 2/2009 |
| WO | WO-2013/050749 A1 | 4/2013 |

(Continued)

OTHER PUBLICATIONS

International Search Report from International Application No. PCT/US2021/046669; dated: Nov. 23, 2021.
(Continued)

*Primary Examiner* — Gerald Gauthier
(74) *Attorney, Agent, or Firm* — Morse, Barnes-Brown & Pendleton, P.C.; Sean D. Detweiler, Esq.

(57) ABSTRACT

A method and apparatus to assist people with hearing loss. An augmented reality device with microphones and a display captures speech of a person talking to the wearer of the device and displays real-time captions in the wearer's field of view, while optionally not captioning the wearer's own speech. The microphone system in this apparatus inverts the use of microphones in augmented reality devices by analyzing and processing environmental sounds while ignoring the wearer's own voice.

19 Claims, 8 Drawing Sheets

(51) Int. Cl.
   *G06F 40/58* (2020.01)
   *G10L 15/22* (2006.01)
   *H04R 1/08* (2006.01)
   *H04R 3/00* (2006.01)
   *H04R 29/00* (2006.01)
   *H04W 4/80* (2018.01)

(52) U.S. Cl.
   CPC ............ *G06F 40/58* (2020.01); *G10L 15/22* (2013.01); *H04R 1/08* (2013.01); *H04R 3/005* (2013.01); *H04R 29/008* (2013.01); *H04W 4/80* (2018.02); *G02B 2027/0138* (2013.01); *G02B 2027/0178* (2013.01)

(58) Field of Classification Search
   CPC . G02B 2027/0178; G02C 11/10; G06F 1/163; G06F 3/012; G06F 40/58; G06F 1/165; G06F 3/011; G06F 3/0346; G06V 20/20; G06V 40/16; G10L 15/22; G10L 15/26; G10L 15/34; G16H 40/67; H04M 1/72412; H04M 1/2471; H04R 1/08; H04R 1/406; H04R 3/005; H04R 29/008; H04R 3/00; H04R 25/505; H04W 4/80; A63F 13/52; G06Q 10/10; G06T 11/00
   See application file for complete search history.

(56) References Cited

U.S. PATENT DOCUMENTS

| | | | | |
|---|---|---|---|---|
| 7,785,197 | B2* | 8/2010 | Smith | A63F 13/52 |
| | | | | 463/31 |
| 8,369,549 | B2* | 2/2013 | Bartkowiak | H04R 25/505 |
| | | | | 381/316 |
| 9,280,972 | B2* | 3/2016 | McCulloch | G10L 15/26 |
| 10,074,381 | B1* | 9/2018 | Cowburn | G06T 11/00 |
| 10,289,205 | B1* | 5/2019 | Sumter | G06F 3/0346 |
| 10,418,034 | B1* | 9/2019 | Mondragon | G06Q 10/10 |
| 10,645,492 | B2 | 5/2020 | McElveen et al. | |
| 10,796,106 | B2* | 10/2020 | Kim | G06F 40/58 |
| 10,997,943 | B2 | 5/2021 | Tao et al. | |
| 11,172,101 | B1 | 11/2021 | Boozer et al. | |
| 11,184,699 | B2* | 11/2021 | Han | H04R 3/005 |
| 11,322,959 | B1 | 5/2022 | Ardisana, II et al. | |
| 11,468,896 | B2* | 10/2022 | Mondragon | G10L 15/26 |
| 11,500,226 | B1* | 11/2022 | Muske | G02B 27/017 |
| 11,538,189 | B1 | 12/2022 | Sztuk et al. | |
| 11,664,022 | B2* | 5/2023 | Kim | G10L 15/34 |
| | | | | 704/235 |
| 12,137,331 | B2* | 11/2024 | Shmukler | H04R 1/1025 |
| 2006/0025214 | A1 | 2/2006 | Smith | |
| 2011/0237295 | A1 | 9/2011 | Bartkowiak et al. | |
| 2012/0206334 | A1* | 8/2012 | Osterhout | G06F 1/163 |
| | | | | 345/156 |
| 2013/0223653 | A1* | 8/2013 | Chang | H04R 3/00 |
| | | | | 381/122 |
| 2013/0346168 | A1* | 12/2013 | Zhou | G06F 1/163 |
| | | | | 701/428 |
| 2014/0123008 | A1* | 5/2014 | Goldstein | H04M 1/2471 |
| | | | | 715/716 |
| 2014/0337023 | A1 | 11/2014 | McCulloch et al. | |
| 2015/0036856 | A1* | 2/2015 | Pruthi | G10L 15/26 |
| | | | | 381/317 |
| 2015/0118961 | A1* | 4/2015 | Petit | H04W 4/80 |
| | | | | 455/41.1 |
| 2016/0078020 | A1 | 3/2016 | Sumita et al. | |
| 2018/0322861 | A1* | 11/2018 | Ibrahim | H04R 29/008 |
| 2019/0068529 | A1* | 2/2019 | Mullins | G06F 40/58 |
| 2019/0138603 | A1* | 5/2019 | Daley | G06F 3/165 |
| 2019/0196191 | A1* | 6/2019 | Oh | G02B 27/017 |
| 2019/0251176 | A1* | 8/2019 | Cheng | G06F 3/165 |
| 2019/0272800 | A1 | 9/2019 | Tao et al. | |
| 2019/0349662 | A1* | 11/2019 | Lindahl | G06F 1/163 |
| 2020/0034113 | A1* | 1/2020 | Holst, III | G10L 15/26 |
| 2020/0143807 | A1 | 5/2020 | Ko | |
| 2020/0194028 | A1* | 6/2020 | Lipman | G06F 3/011 |
| 2020/0265839 | A1* | 8/2020 | McAnallan | H04M 1/72412 |
| 2021/0018752 | A1* | 1/2021 | Sheng | G02B 6/0018 |
| 2021/0165975 | A1* | 6/2021 | Osterhout | G02B 27/017 |
| 2021/0312940 | A1* | 10/2021 | Lipman | G06F 3/012 |
| 2022/0254019 | A1* | 8/2022 | Connor | G16H 40/67 |
| 2022/0270595 | A1 | 8/2022 | Kroehl et al. | |
| 2022/0284254 | A1* | 9/2022 | Sprague | G06K 19/07762 |
| 2023/0188894 | A1 | 6/2023 | Shmukler et al. | |
| 2023/0225637 | A1 | 7/2023 | Lee et al. | |
| 2023/0238001 | A1* | 7/2023 | Westner | G06F 1/163 |
| | | | | 704/235 |
| 2025/0149042 | A1 | 5/2025 | Westner | |

FOREIGN PATENT DOCUMENTS

| | | |
|---|---|---|
| WO | 2022/051097 A1 | 3/2022 |
| WO | 2025/096057 A1 | 5/2025 |

OTHER PUBLICATIONS

International Search Report from International Application No. PCT/US2024/045374, dated: Nov. 22, 2024.

* cited by examiner

EYEGLASS AUGMENTED REALITY SPEECH TO TEXT DEVICE AND METHOD

CROSS-REFERENCED TO RELATED APPLICATIONS

This application is a national stage filing under 35 U.S.C. 371 of International Application No. PCT/US2021/046669, filed Aug. 19, 2021, which claims priority to, and the benefit of, U.S. Provisional Application No. 63/074,210 filed Sep. 3, 2020, for all subject matter contained in said applications. The entire teachings of said applications are incorporated by reference herein. International Application No. PCT/US2021/046669, was published under PCT Article 21 (2) in English.

FIELD OF THE INVENTION

The present invention relates to a device and method directed to assist people with hearing loss. An augmented reality device, which is configured to attach to eyeglasses to provide microphones and a display, captures the speech of the person talking to the wearer of the device and displays real-time captions in the wearer's field of view, while not captioning the wearer's own speech.

BACKGROUND

Generally, augmented reality glasses have the potential to assist people with hearing loss. Conventional augmented reality glasses, or smart glasses, can recognize speech and in real-time convert said speech into text captions that are then displayed in see-thru lenses or monocular displays that are perceived to be see-thru. These devices and systems can also translate captured audio speech into text of a different language. Commercially available augmented reality devices employ a camera and video analysis to detect real-world objects. Augmented reality devices can attach to eyeglass frames, and device displays can be mechanically positioned for the wearer's viewing angle.

Devices with multiple microphones implement methods to capture a desired audio signal while rejecting other sounds. Conventional methods detect voice activity, and hearing aid devices implement own voice detection.

Smartphone speech-to-text apps provide real-time captions of audio streamed into the device via built-in microphones, or by other means. Smartphone accessory devices transmit data to the smartphone, where the data is processed or transformed and transmitted back to the accessory device.

However, these devices experience some shortcomings. Hearing aid devices do not perform well under unfavorable conditions of various background noises as well as the presence of sounds other than the sounds the wearer wants to hear. Microphones in hearing aid devices, as well as beamforming microphone arrays, tend to target the most prominent sound, which is not always the sound the user desires. For users with more severe hearing loss, the processing capabilities of these devices are inadequate to aid aural word recognition.

While smartphone speech-to-text apps provide real-time captions of people talking, the user experience is unnatural, and the benefits are limited. Reading the captions while speaking with someone else requires the user to hold up the smartphone with one hand to clearly view the screen while also paying attention to the other person. The smartphone microphones may not be designed to adequately capture the desired speech sound, which increases the word error rate (WER). Speech-to-text apps do not suppress captioning of the user's own voice.

As a supplementary assistive device for hearing loss, current augmented reality devices fall short. Systems and methods of conventional augmented reality glasses that may perform speech-to-text captioning fail to reject the wearer's own voice in the process, forcing the wearer to see captions for their own speech, contrary to their desired goal of better understanding what others say. Current voice activity detection methods assume there's only one voice to be detected. Own voice detection in hearing aids rely solely on the sensors that are integrated into the hearing aid.

Commercially available augmented reality glasses are vision-centric and do not perform environmental audio analysis. The microphones integrated into commercially available augmented reality glasses are designed to only capture the wearer's voice and reject other sounds.

Augmented reality glasses are overloaded with features, sensors, multimedia capabilities, multiple applications, and complex user interactions—making these devices difficult to build, expensive for customers to purchase, and complicated for users to use—all major barriers for older people with disabilities living on a fixed income. Potential users of smart glasses are sensitive to how the glasses look and feel—especially those with behind-the-ear (BTE) hearing aids who prefer thin wire temple pieces, rather than the thicker temple pieces required to embed electronics, batteries and sensors. Smart glasses must also accommodate prescription lenses.

SUMMARY

There is a need for supplementing hearing loss with other sensory information to support communication, awareness and understanding. The present invention is directed toward further solutions to address this need, in addition to having other desirable characteristics.

In accordance with example embodiments of the present invention, an augmented reality device is provided, the device includes a body, one or more mounting mechanisms configured to mount the body to eyeglasses; at least two microphones systems disposed in the body comprised of a first system comprising at least one microphone positioned outwardly to target a non-wearer and a second microphone system, comprising at least one microphone positioned inwardly to target a wearer of the device; a processor configured to process signals from the at least two microphone systems; and a display positioned in a field of view of the wearer. The at least two systems emit signals having comparatively different signal power profiles enabling distinguishing of audible voice of the wearer from other sounds. The display renders text based on audible voice of the non-wearer that is captured on the first microphone system.

In accordance with aspects of the present invention, the second microphone system captures voice commands for the device.

In accordance with aspects of the present invention, the second microphone system is used as a voice input for another device connected wirelessly.

In accordance with aspects of the present invention, the device uses signal power comparisons to distinguish between the audible voice of the wearer and the other sounds. In certain aspects, two such devices are attached to each side of the eyeglasses and the microphones from each device together form a microphone array to capture sounds.

In accordance with aspects of the present invention, the rendered text includes a translation of speech from one language into text of a different language.

In accordance with aspects of the present invention, the rendered text is extended to capture and represent additional characteristics and information from a received audible voice, comprising inflections, emphasis, emotional valence, and recognized voices.

In accordance with aspects of the present invention, the rendered text also captures and displays speech from the second microphone system.

In accordance with aspects of the present invention, a real-time audio volume level is rendered on the display as a level meter, indicating a volume of the audible voice of the wearer as captured by the second microphone system. In certain aspects the level meter indicates when the wearer is speaking too quietly or too loudly, where the first microphone system receives and measures an ambient sound level as an input into the level meter.

In accordance with aspects of the present invention, the device further includes a wireless transceiver. In some such aspects, the wireless transceiver comprises a short-range wireless transceiver.

In accordance with aspects of the present invention, the device further includes a camera.

In accordance with example embodiments of the present invention, a method of providing speech to text conversion is provided. The method involves providing the augmented reality device disclosed herein, receiving speech audio on the microphone systems of the device, performing speech to text conversion on the speech audio, and displaying the text display of the device.

In accordance with aspects of the present invention, performing speech to text conversion, further includes sending received speech audio from the device to a connected device; performing speech to text conversion on the connected device; and sending the text data to the device from the connected device.

BRIEF DESCRIPTION OF THE FIGURES

These and other characteristics of the present invention will be more fully understood by reference to the following detailed description in conjunction with the attached drawings, in which.

DETAILED DESCRIPTION

FIGS. 1 through 8, wherein like parts are designated by like reference numerals throughout, illustrate an example embodiment or embodiments of an eyeglass attachment with at least two microphones, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 1:
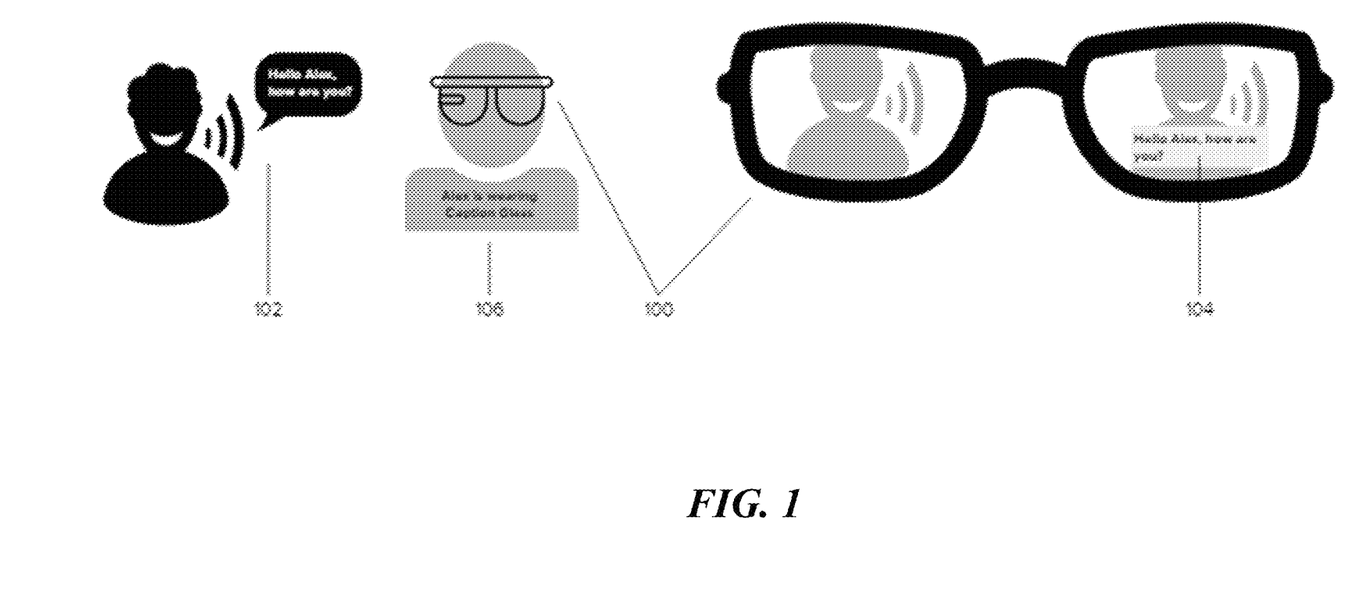
FIG. 1 shows how the device is used by a person wearing the device, communicating with another person.

The present invention is generally directed to a system 100, illustrated in FIG. 1 as a device 112 in the form of an eyeglass attachment apparatus and method for capturing speech from a talker 102 and converting said speech in real-time into text that is displayed in a display 104 of the wearer 106.

Figure 2:
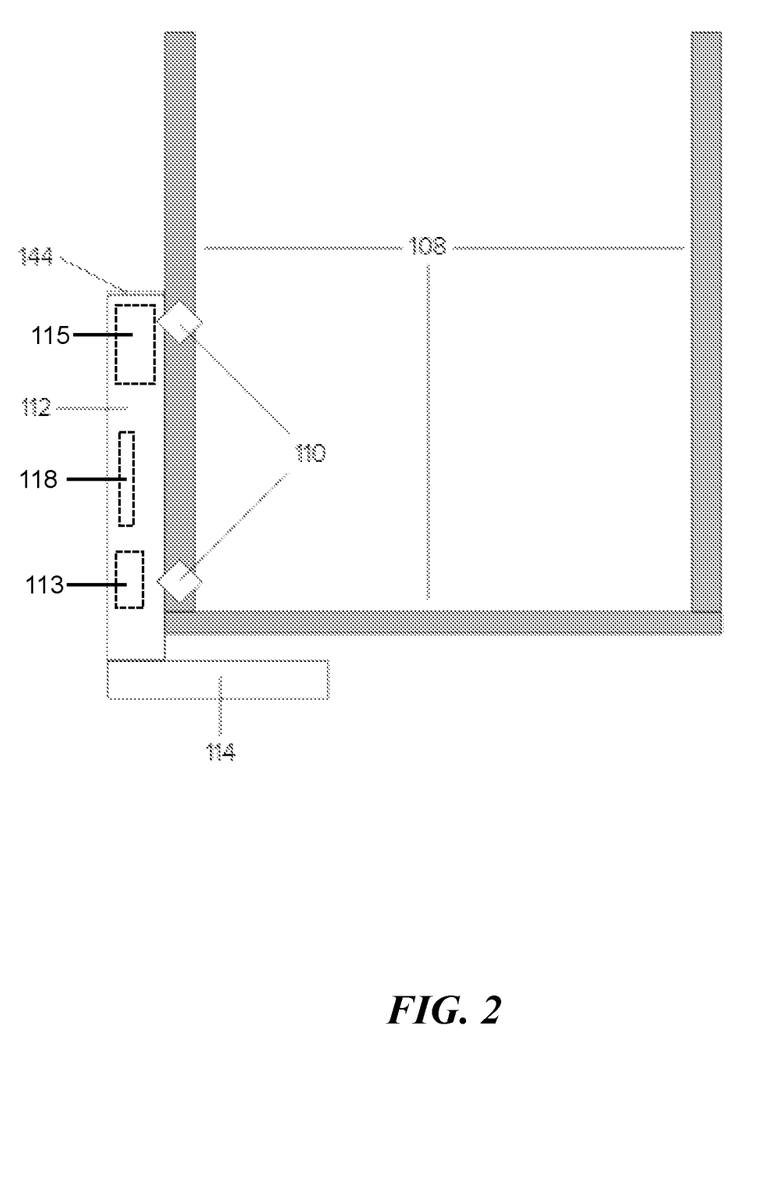
FIG. 2 shows a top view of the device that attaches to an existing pair of eyeglasses.

FIG. 2 shows the device 112 attaching at two positions to the frame of a pair of eyeglasses 108. The attachment mechanisms 110 may be mechanical clips or magnets, or the like, and are compatible with standard eyeglass temple styles from thick to thin. The device attaches to the eyeglasses 108 via the body of the device 112, which houses all of the required electrical, computational, and input/output components including at least one processor 113, memory, a rechargeable lithium-ion battery 115, wireless communication transceiver 118 (such as Bluetooth® and other short-range wireless protocols), at least two microphone systems with analog-to-digital converters, other sensors, and the components required to render text and images to the display 114. The display 114 is attached to the front of the body of the device 112. A charging plate 144 is mounted on the rear of the device 112.

Figure 3:
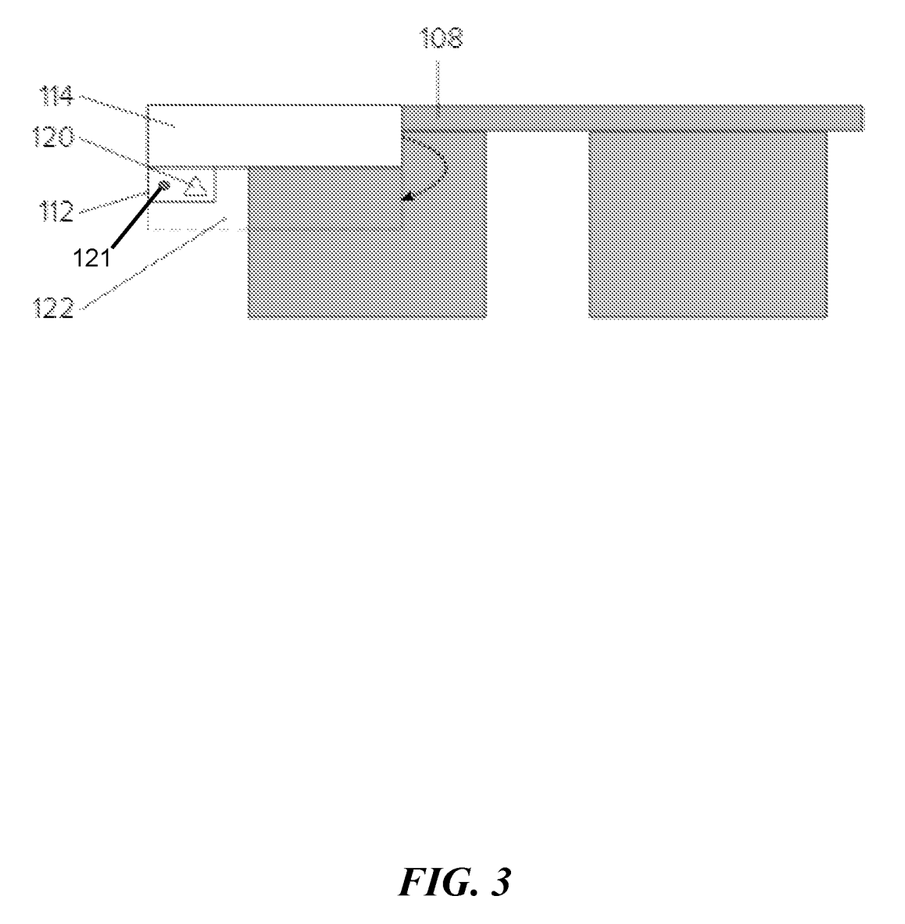
FIG. 3 shows a front view of the device that attaches to an existing pair of eyeglasses, including the wearer microphone(s) and the adjustable display.

FIG. 3 shows the front view of the device 112 as attached to a pair of eyeglasses 108. Embedded or otherwise disposed into body at the front of the device 112 is a microphone system comprising at least one microphone or array of microphones 120 is directed or positioned inwardly towards the mouth of the wearer 106 to target the wearer 106. The display 114 is adjustable to change a viewing angle, horizontal and vertical position 122 with respect to the wearer 106. The display 114 may make use of an LCD, or OLED display placed in the viewers field of view, a projector projecting an image on the lenses of the eyeglasses 108, image reflection techniques known in the art, or any combination of technologies used for displaying information in the field of augmented reality. In certain embodiments, the device 112 may further include a camera 121.

Figure 4:
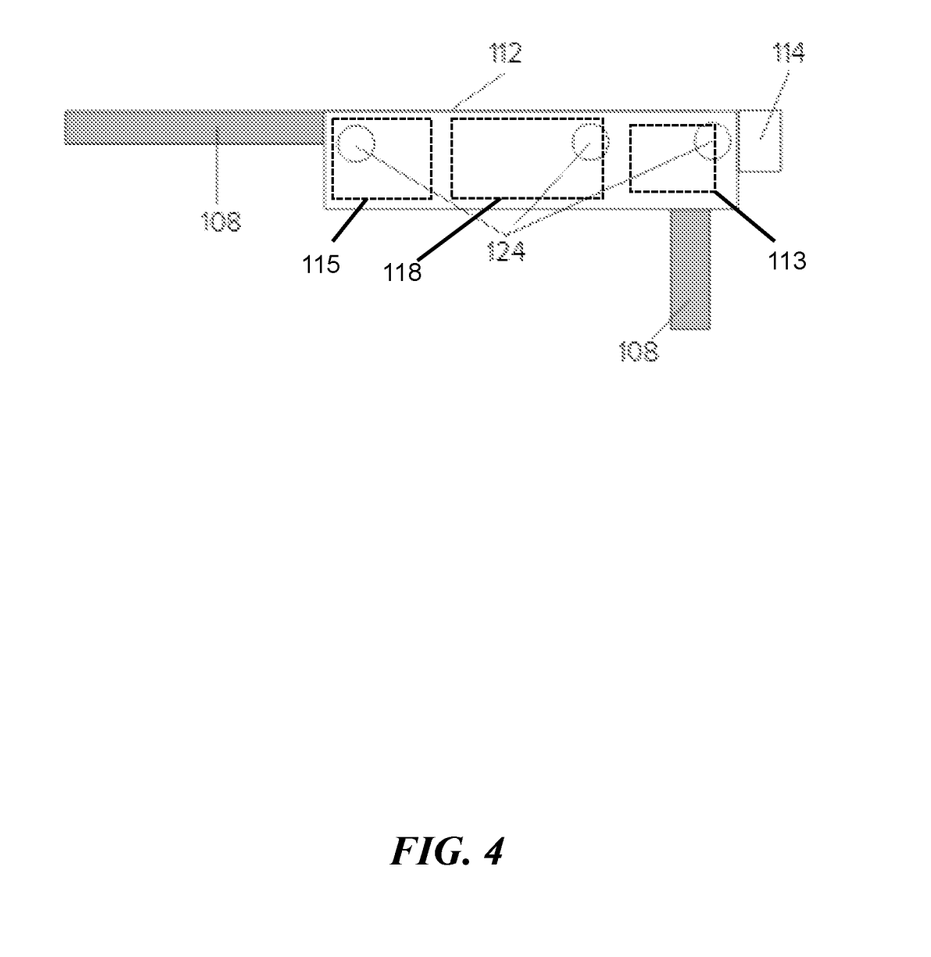
FIG. 4 shows a side view of the device that attaches to an existing pair of eyeglasses, including the microphone system directed at the talker.

FIG. 4 shows the side view of the device as attached to a pair of eyeglasses 108. Another microphone system comprising one or more microphones 124 directed or positioned outwardly to target a non-wearer is embedded or disposed into the body at the surface of the device 112. The acoustic design of the microphones 124 integrates with the audio signal processing performed by a processor 113 in the device 112 to capture the speech of the talker 102 not wearing the device 112.

Figure 5:
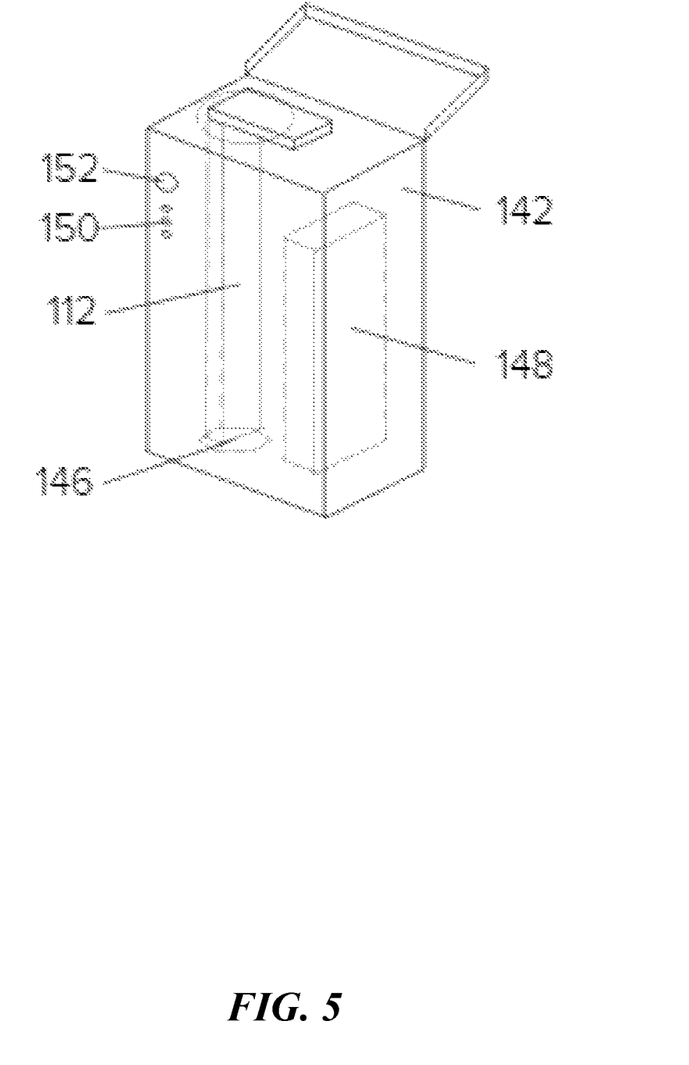
FIG. 5 shows the form and function of the charging case used to store and charge the device.

FIG. 5 shows the device charging case 142, with the device 112 shown inside the case. When the device 112 is inside the case, the device charging plate 144 connects with the case charging plate 146 to charge the device via the case battery 148. One or more LED light indicators 150 show the battery level of the device 112, Bluetooth® pairing status, or other information about the device. A charging case button 152 may be used to show the battery status of the device 112, activate Bluetooth® pairing, or other such functions.

Figure 6:
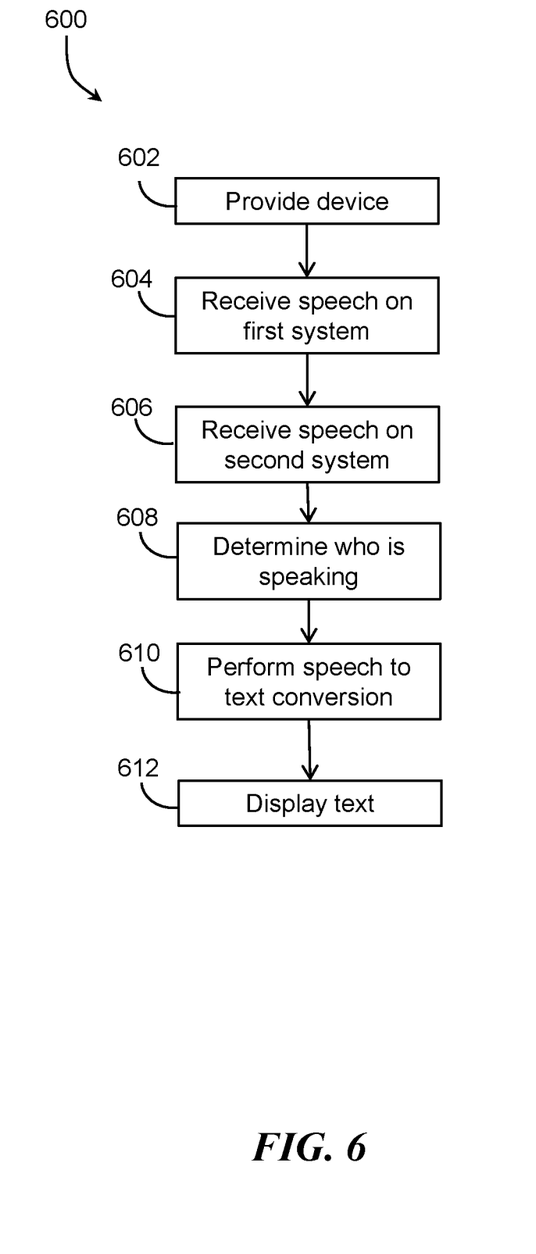
FIG. 6 is a high level flow diagram for a method of providing speech to text conversion using the device.

FIG. 6 is a high level flow diagram 600 depicting how the device 112 can be used to provide speech to text conversion. First, a device 112 as disclosed herein is provided to a wearer 106 (step 602). Speech audio is received by the one or more microphone 124 of the first microphone system of the device 112 (step 604). Speech audio is received by the one or more microphone 120 of the second microphone system of the device 112 (step 606). The signal power profiles of the one or more microphones 120 of the second microphone system and the one or more microphones 124 of the first system are compared to determine if the wearer 106 or a non-wearer 102 is speaking (step 608). If the one or more wearer directed microphones 120 of the second system are louder than the one or more microphones 124 of the first system, then the device 112 determines the wearer 106 is speaking distinguishing their speech from the speech of a non-wearer talker 102 and if the one or more non-wearer directed microphones 124 of the first system are louder, then the device 112 determines that the non-wearer talker 102 is speaking. Speech to text conversion is then performed (step 610). The speech to text conversion is performed on the speech audio of the non-wearer but in some embodiments, the speech of the wearer may also be converted. The resulting text data is then displayed to the wearer 106 on the display 114 of the device 112 (step 612). The displayed text is of the speech audio of the non-wearer talker 102 but in some embodiments may include text of the speech audio of the wearer 106.

Figure 7:
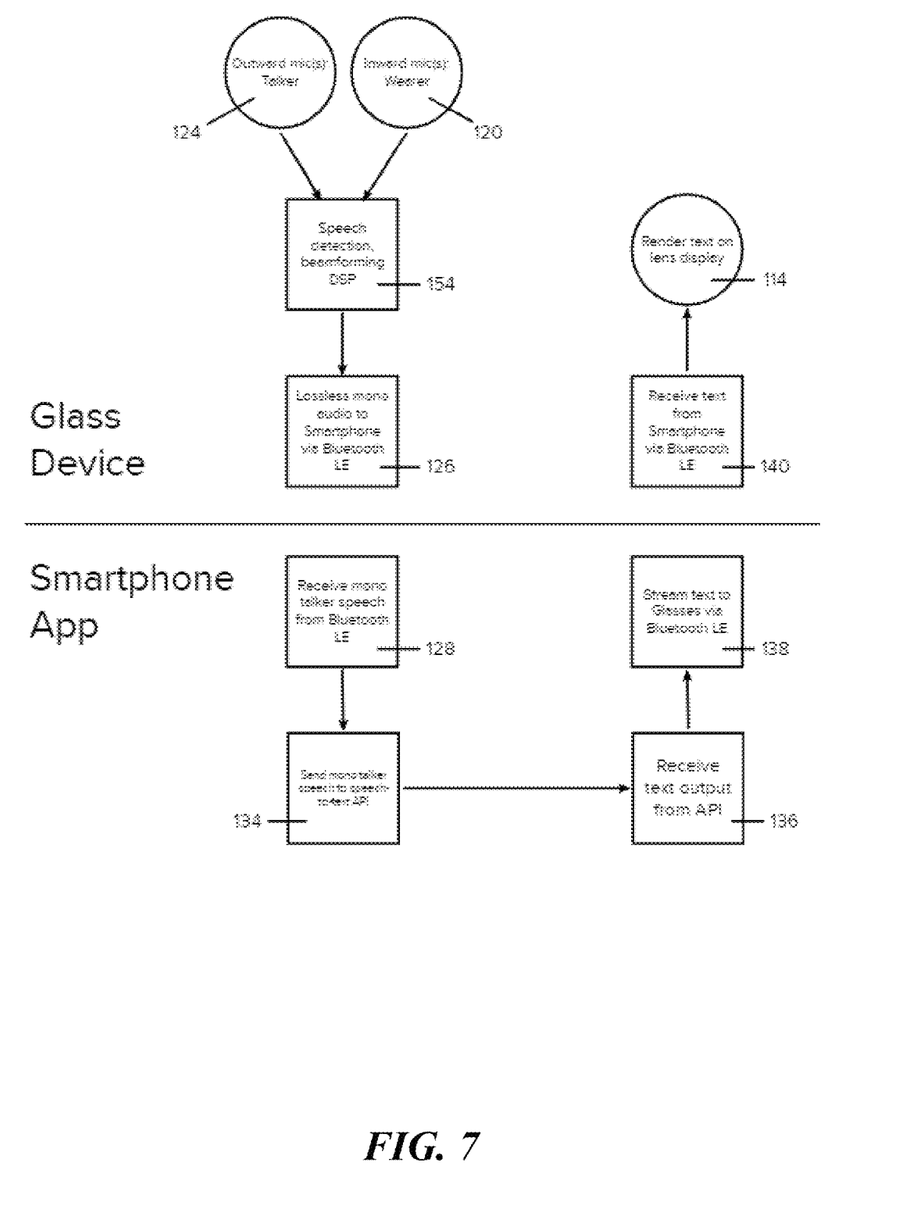
FIG. 7 shows the flowchart of the method used to capture speech from a talker and convert it into text on the display of the wearer.

In certain embodiments, methods for analyzing the microphone inputs and converting speech into text, are programmed and executed by the processor 113 of the device 112 in conjunction with an application operating on a connected device, such as a smartphone, as shown in FIG. 7. The system 100 includes an application executing on a user's smartphone that the user must first download and install onto their smartphone via the traditional device application stores. Prior to first use of the device 112, it must be communicatively paired or otherwise connected with the smartphone while in its charging case 142. Pressing and holding the multi-function button 152 on the charging case places the device 112 into pairing mode, indicated with the blinking blue light LED indicator 150. The user then connects to the device from their smartphone by tapping the device name via the traditional settings known to those of ordinary skill in the art. Once connected, the LED indicator 150 emits a solid blue, and the device 112 automatically starts sending and receiving data to and from the smartphone application. To begin operation, the device 112 powers on automatically when it is removed from its charging case 142.

Inside the device 112, the output signals from the first microphone system 124 and the second microphone system 120 are fed into the processor 113 that uses various algorithms 154 including, but not limited to, own voice detection, beamforming, noise reduction, and speech detection. Own voice detection is accomplished by measuring and comparing the signal power profiles of the one or more microphones 120 of the second microphone system and the one or more microphones 124 of the first microphone system. If the one or more wearer directed microphones 120 of the second system are louder than the one or more microphones 124 of the first system, then the device 112 determines the wearer 106 is speaking distinguishing their speech from the speech of a talker 102 not wearing the device 112 and it will not transcribe the wearer's own speech—the signal will not be transmitted further. If the talker directed microphone(s) 124 of the first system are louder, then the device 112 determines that the talker 102 is speaking and the process will continue. The mono speech output signal is converted into a 16 kHz, 16-bit mono signal using a lossless audio codec, and then the speech audio is sent or otherwise transmitted to the smartphone via a short-range wireless technology such as Bluetooth® LE 126.

The smartphone application on the connected smartphone receives the mono speech signal from talker 102 via a short-range wireless technology, such as via Bluetooth® LE 128. The application streams the audio through a speech-to-text subsystem providing speech to text conversion and receives a text stream of the input speech stream 136. The text stream is packaged to be sent or transmitted via a short-range wireless technology such as Bluetooth® LE 138, and the device receives the text data into a text data buffer via the short-range wireless technology such as Bluetooth® LE stream 140.

The device continually renders or otherwise displays the text data buffer into an image that is rendered on the display 114.

The device 112 may be powered off by returning it to its charging case 142.

The speech-to-text subsystem may be realized in a cloud-based service, locally implemented in the smartphone application, or as a combination of a local implementation and a cloud service.

Depending on the capabilities of the speech-to-text subsystem in the smartphone app, the user may change the text output language setting independently from the input audio language setting, allowing the device to be used to translate speech from one language into text of a different language.

In another embodiment, the functionality for text-to-speech is extended to capture and represent additional characteristics and information from the captured audible voice audio including inflections, emphasis, emotional valence, and recognized voices.

In some embodiments, the speech-to-text functionality also provides a rendering of text for the speech of the wearer captured on the second microphone system.

In certain embodiments, a volume level meter or other indication is rendered on the display 114. For example, the rendered volume on the display 114 may indicate the volume of wearer's speech as detected by the second microphone system. In some cases, this may further indicate the wearer's volume in comparison to the other audible speakers as detected by the first microphone system. Such indication can let the wearer know that they are speaking too loud or too quiet in comparison to other speakers or the ambient sound level.

In embodiments where the device 112 further includes a camera 121. The camera 121 can be used to track mouth or lip movement to improve the accuracy of the speech-to-text functionality.

Another embodiment does not depend on a smartphone for the speech-to-text subsystem; rather the speech-to-text subsystem is implemented in the device 112. With the addition of a WiFi® (wireless network protocols based on the IEEE 802.11) and/or cellular antenna, the speech-to-text subsystem may be realized as a cloud-based or edge service.

Another embodiment adds to or integrates into a pair of augmented reality eyeglasses an additional outward-facing microphone or microphone array, in the case where the eyeglasses already include one or more microphones to capture the wearer's own voice. The additional outward-facing microphone is mounted to the eyeglasses in the same manner and position as the device 112 described herein, just in simpler form with only a single outward-facing microphone.

Another embodiment enables the device 112 to use the wearer directed microphone(s) of the second microphone system for device voice commands or as voice input for another device connected via as short-range wireless technology such as Bluetooth®.

Another embodiment augments the single device 112 attachment with a second device 112, such there is a device 112 on each side of the eyeglasses, to be used together with the first device as a 2-channel microphone array that can track sounds in front of the wearer. Mounting and operation of the second attachment is as would be well understood by those of skill in the art given the present disclosure.

Another embodiment allows the user to change the audio input to other sources for captioning, enabling real-time captioning of phone calls, podcasts, audio books, television, laptop audio, etc.

Figure 8:
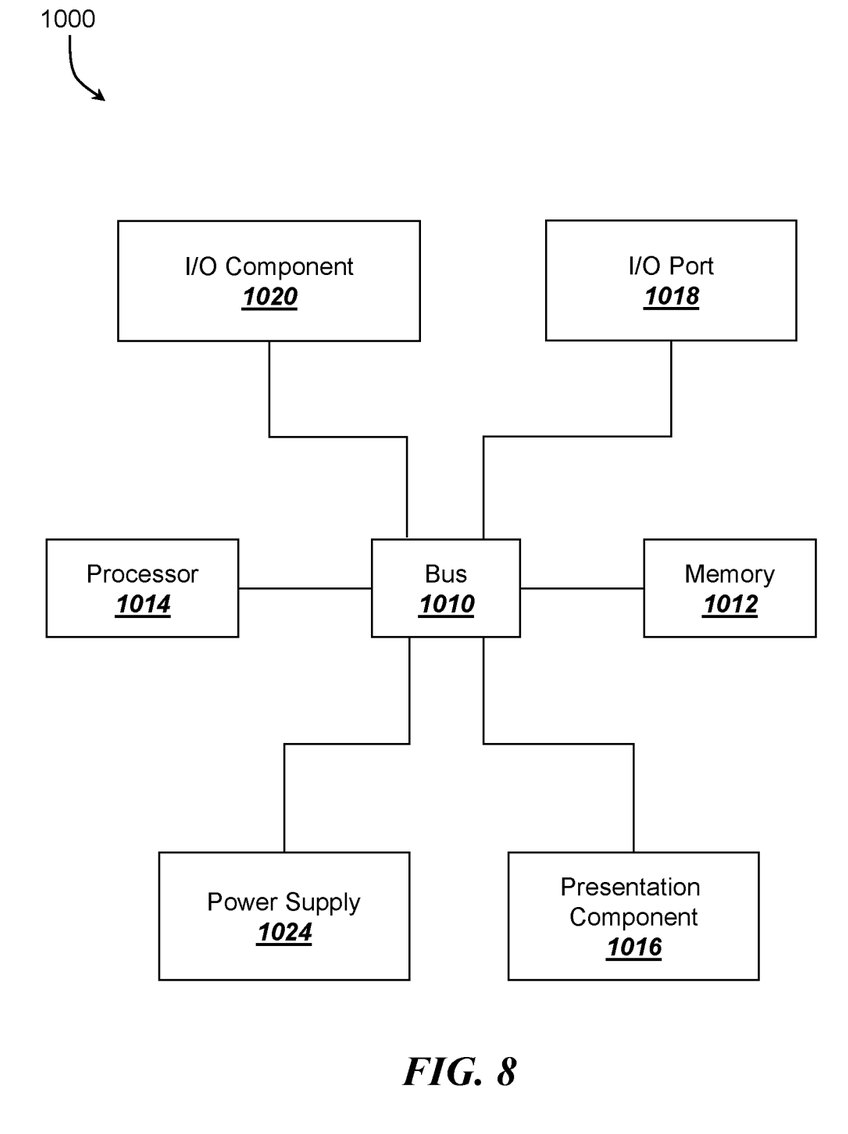
FIG. 8 is a diagrammatic illustration of a high-level architecture configured for implementing processes in accordance with aspects of the invention.

One illustrative example of a computing device 1000 used to provide the functionality of the present invention, such as provided by the device 112 or connected device (such as a smart phone), is depicted in FIG. 8. The computing device 1000 is merely an illustrative example of a suitable special purpose computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors 1014 (such as processor 113) that read data from components such as the memory 1012, the various I/O components 1016, etc. Presentation component(s) 1016 present data indications to a user or other device. Exemplary presentation components include a display device (such as display 114), speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphones (such as microphones 120, 124), joystick, recording device, game pad, satellite dish, scanner, printer, wireless device 118, networking device, and the like.

The power supply 1024 can include batteries (such as a lithium ion battery 115). Other suitable power supply or batteries will be apparent to one skilled in the art given the benefit of this disclosure.

To any extent utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A device, comprising:
    a body;
    at least two microphones systems disposed in the body comprised of a first system comprising at least one microphone positioned outwardly to target a non-wearer and a second microphone system, comprising at least one microphone positioned inwardly to target a wearer of the device;
    a processor configured to process signals from the at least two microphone systems; and
    a display positioned in a field of view of the wearer;
    wherein the at least two systems emit signals having comparatively different signal power profiles enabling distinguishing of audible voice of the wearer from other sounds;
    wherein processing signals comprises performing speech to text conversion on the received speech audio of a non-wearer comprising:
        sending received speech audio from the device to a connected device;
        performing speech to text conversion on the connected device; and
        sending the text data to the device from the connected device; and
    wherein the display renders text based on audible voice of the non-wearer that is captured on the first microphone system.

2. The device of claim 1, where the second microphone system captures voice commands for the device.

3. The device of claim 1, where the second microphone system is used as a voice input for another device connected wirelessly.

4. The device of claim 1, wherein the device uses signal power comparisons to distinguish between the audible voice of the wearer and the other sounds.

5. The device of claim 4, where two such devices are located on each side of eyeglasses and the microphones from each device together form a microphone array to capture sounds.

6. The device of claim 1, wherein the rendered text includes a translation of speech from one language into text of a different language.

7. The device of claim 1, wherein the rendered text is extended to capture and represent additional characteristics and information from a received audible voice, comprising inflections, emphasis, emotional valence, and recognized voices.

8. The device of claim 1, wherein the rendered text also captures and displays speech from the second microphone system.

9. The device of claim 1, wherein a real-time audio volume level is rendered on the display as a level meter, indicating a volume of the audible voice of the wearer as captured by the second microphone system.

10. The device of claim 9, wherein the level meter indicates when the wearer is speaking too quietly or too loudly, where the first microphone system receives and measures an ambient sound level as an input into the level meter.

11. The device of claim 1, further comprising a wireless transceiver.

12. The device of claim 11, wherein the wireless transceiver comprises a short-range wireless transceiver.

13. The device of claim 1, further comprising a camera.

14. The device of claim 1, further comprising one or more mounting mechanisms configured to mount the body to eyeglasses.

15. The device of claim 1, wherein the device is attached to eyeglasses.

16. A method of providing speech to text conversion, the method comprising:
    providing a device comprising:
        a body;
        at least two microphones systems disposed in the body comprised of a first system comprising at least one microphone positioned outwardly to target a non-wearer and a second microphone system, comprising at least one microphone positioned inwardly to target a wearer of the device;
        a processor configured to process signals from the at least two microphone systems; and
        a display positioned in a field of view of the wearer;
        wherein the at least two systems emit signals having comparatively different signal power profiles enabling distinguishing of audible voice of the wearer from other sounds; and
        wherein the display renders text based on audible voice of the non-wearer that is captured on the first microphone system;
    receiving speech audio on the first microphone system;
    receiving audio on the second microphone system; and
    comparing the signal power profiles of the one or more microphones of the second microphone system and the one or more microphones of the first system to determine when the wearer or a non-wearer is speaking;
    wherein, when the one or more wearer directed microphones of the second system are louder than the one or more microphones of the first system, then the device determines the wearer is speaking distinguishing their speech from the speech of a non-wearer and when the one or more non-wearer directed microphones of the first system are louder, then the device determines that the non-wearer is speaking;
    performing speech to text conversion on the received speech audio of a non-wearer comprising:
        sending received speech audio from the device to a connected device;
        performing speech to text conversion on the connected device; and
        sending the text data to the device from the connected device; and
    displaying text for the speech audio of the non-wearer via the display of the device.

17. The method of claim 16, wherein the speech audio of the wearer is also converted to text and displayed.

18. The method of claim 16, wherein the device further comprises one or more mounting mechanisms configured to mount the body to eyeglasses.

19. The method of claim 16, wherein the device is attached to eyeglasses.

\* \* \* \* \*